US006820474B2

(12) United States Patent
Rueger et al.

(10) Patent No.: US 6,820,474 B2
(45) Date of Patent: Nov. 23, 2004

(54) METHOD FOR THE DIAGNOSIS OF THE VOLTAGE CONTROL FOR A PIEZOELECTRIC ACTUATOR OF AN INJECTION VALVE

(75) Inventors: Johannes-Joerg Rueger, Vienna (AT); Matthias Mrosik, Sparrhärmlingweg (DE); Volker Pitzal, Waldstetten/Wissgoldingen (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/240,338

(22) PCT Filed: Feb. 2, 2001

(86) PCT No.: PCT/DE01/00393

§ 371 (c)(1), (2), (4) Date: Jul. 1, 2003

(87) PCT Pub. No.: WO01/75289

PCT Pub. Date: Oct. 11, 2001

(65) Prior Publication Data

US 2004/0008032 A1 Jan. 15, 2004

(30) Foreign Application Priority Data

Apr. 1, 2000 (DE) ........................................ 100 16 476

(51) Int. Cl.[7] .............................................. G01M 15/00

(52) U.S. Cl. .................................................... 73/119 A

(58) Field of Search ................................ 73/116, 117.2, 73/117.3, 118.1, 119 A, 119 R, 112, 115; 701/29, 101, 102, 103, 104

(56) References Cited

U.S. PATENT DOCUMENTS 6,366,868 B2 * 4/2002 Freudenberg et al. ....... 702/115
6,472,796 B1 * 10/2002 Hoffmann et al. ..... 310/316.03
6,487,505 B1 * 11/2002 Mock et al. .................. 702/33
2001/0039484 A1 * 11/2001 Freudenberg et al. ....... 702/115
2002/0023622 A1 * 2/2002 Rueger et al. .............. 123/490
2002/0041475 A1 * 4/2002 Rueger et al. ............. 361/91.1
2003/0221478 A1 * 12/2003 Hart et al. ................. 73/118.1

FOREIGN PATENT DOCUMENTS

| | | |
|---|---|---|
| DE | 197 42 073 | 3/1999 |
| DE | 198 04 196 | 8/1999 |
| DE | 198 45 042 | 4/2000 |
| WO | WO 99 07026 | 2/1999 |
| WO | WO 99 67527 | 12/1999 |

* cited by examiner

*Primary Examiner*—Eric S. McCall
(74) *Attorney, Agent, or Firm*—Kenyon & Kenyon

(57) ABSTRACT

A method is proposed for diagnosing the drive voltage for a piezoelectric actuator of an injector, in which the drive voltage is measured for the individual phases of the injection procedure. With respect to each control phase, a corresponding tolerance band is provided, which is set using the setpoint value of the drive voltage. The tolerance ranges are established as a function of operating and/or environmental conditions. If, for the individual drive cycles, the corresponding tolerance ranges are not reached, then, in response to repeated measurement, these erroneous measurements are counted. When a preestablished number for the erroneous measurements is exceeded, then an ongoing error is diagnosed. If, after a certain time, the number is not exceeded, then the counter is reset. In the case of an error, the error storage unit can be reset using a maintenance plug-in device during maintenance.

14 Claims, 4 Drawing Sheets

METHOD FOR THE DIAGNOSIS OF THE VOLTAGE CONTROL FOR A PIEZOELECTRIC ACTUATOR OF AN INJECTION VALVE

FIELD OF THE INVENTION

The present invention relates to a method for diagnosing the drive voltage for a piezoelectric actuator of an injector.

BACKGROUND INFORMATION

It is already known to use piezoelectrically driven injectors especially for a common-rail system. In this context, for initiating the injection procedure, the actuator is driven by an appropriate voltage, so that, based on the actuator's change in length, a valve needle opens or closes the injection channel for the injection procedure. Because the injection medium, especially fuel for an internal combustion engine, is under high pressure, an exact duration for the opening and closing of the injector is necessary for the high-precision dosing of the injection quantity. Especially in injectors having a double-switching control valve, the problem arises that, due to the hysteresis behavior of the piezoelectric actuator, different voltages are required both for the closed position in the second seat as well as for the two "open" positions, in accordance with the switching direction. When the designated drive voltage of the actuator is not achieved, the result can be injection failure and therefore the uneven running of the engine, deterioration of exhaust emissions, and a decline in the comfort level.

SUMMARY OF THE INVENTION

In contrast, the method according to the present invention has the advantage that, by creating a tolerance band for each driving, a simple monitoring of the drive sequence is possible. It is especially advantageous that the tolerance bands are established taking into account system and injection conditions, so that a plausibility check can easily determine whether the desired drive voltage was present in the instantaneous injection cycle.

It is especially advantageous that the drive voltage is measured in the area of the actuator clamps, so that line interruptions right up to the actuator are detected simultaneously.

In injection systems having a multiple injection within one drive curve cycle, it is advantageous that the desired level of the drive voltage be monitored in each phase of the injection. In this manner, it is assured that each injection pulse is monitored and errors are easily recognized.

As a result of the symmetrical position of the tolerance bands around the setpoint values, it is assured that overcontrolling or undercontrolling is detected to the same degree.

In an injector having a double-switching control valve, there are for the individual switching states at least four voltage levels, which can be advantageously monitored in a simple manner without excessive cost.

When one of the predetermined tolerance bands is not reached, then an error exists, which can lead to a disruption in the injection, faulty injection, or engine damage.

In particular, by a multiple measuring and counting of the faulty measuring values, it is possible to carry out a fault analysis in a simple manner. For example, if a fault only occurs sporadically, then this can be evidence of a harmless disturbance. In this case, the counter is automatically reset.

Only if a fault occurs continuously can the conclusion be reached that the corresponding actuator, i.e., the corresponding injector, is not operating normally. In the case of a fault of this type, if there is a persisting deviation from regulation, then in an alternative configuration there can be a switchover from "regulate drive voltage" to "control drive voltage," in order to advantageously maintain at least emergency operation.

However, if the actuator itself should be defective, then it is switched off, so as not to damage the control unit having its end stage.

It is also advantageous to retain the most recently selected drive voltage, if the assumption can be made that, for example, the regulation is not operating as desired.

An error that arises is advantageously stored so that it may be reproduced, for example, in the workshop and the corresponding component part can be replaced.

In particular, to meet fuel economy and exhaust gas emission requirements, the application of the method seems advantageous in a common-rail injection system.

DETAILED DESCRIPTION

Figure 1:
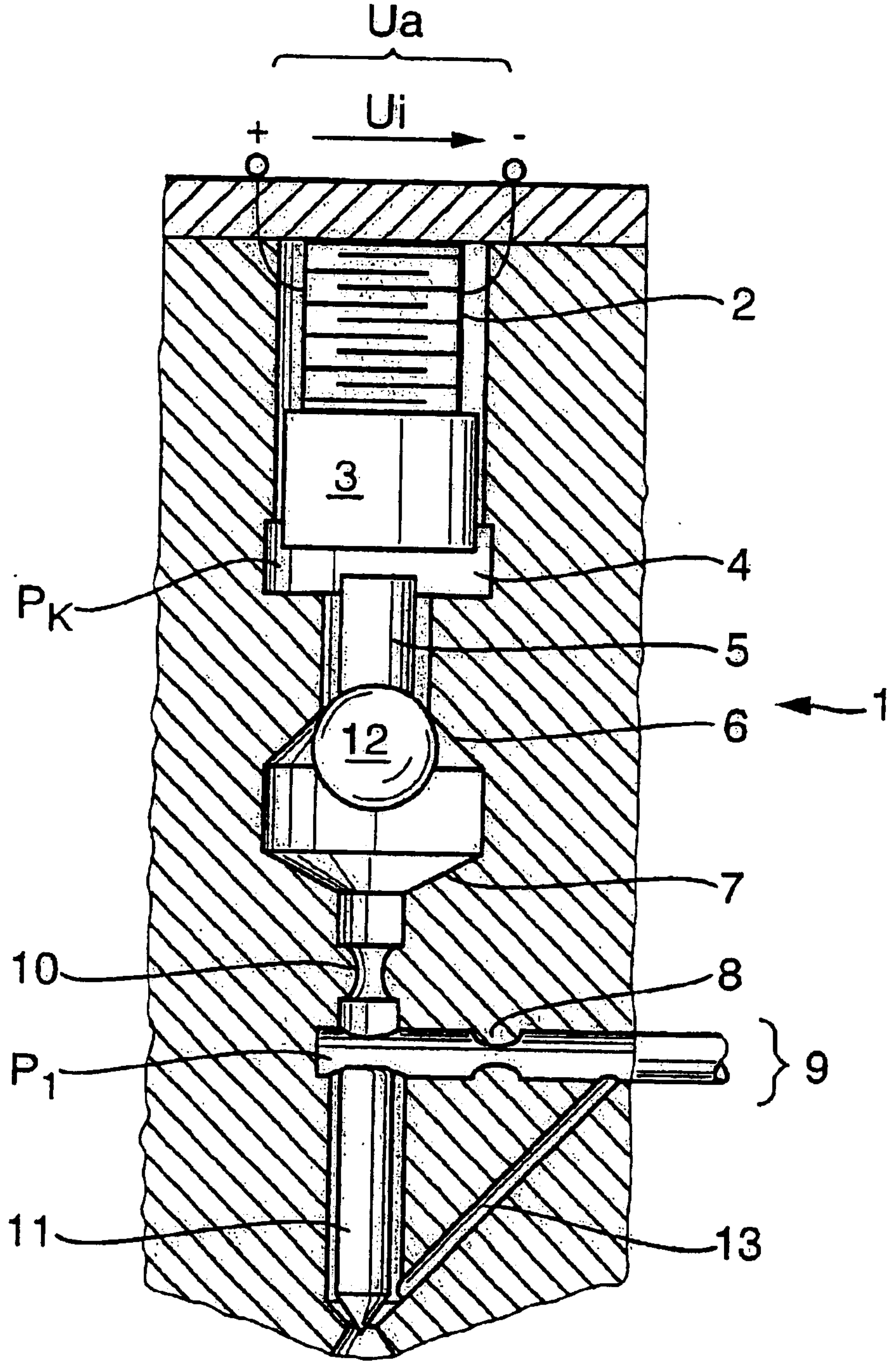
FIG. 1 depicts an injector having a double-switching control valve.

FIG. 1 in schematic representation depicts an injector 1 having a central bore. An operating piston 3 having a piezoelectric actuator 2 is introduced in the upper part, operating piston 3 being fixedly joined to actuator 2. Operating piston 3 stops hydraulic coupler 4 towards the top, whereas, towards the bottom, an opening is provided having a connecting channel leading to a first seat 6, in which a piston 5 having a sealing member 12 is arranged. Sealing member 12 is configured as a double-closing control valve. It seals first seat 6, when actuator 2 is in the resting phase. When actuator 2 is actuated, i.e., when a drive voltage Ua is applied to terminals +, −, actuator 2 actuates operating piston 3 and, via hydraulic coupler 4, presses piston 5 having sealing member 12 in the direction of a second seat 7. Arranged below the second seat, in a corresponding channel, is a jet needle 11, which closes or opens the outlet in the high-pressure channel (common-rail pressure) 13, depending on which drive voltage Ua is applied. The high pressure is conveyed via a supply line 9 by the medium to be injected, for example, fuel for an internal combustion engine. Using a supply-line throttle 8 and an outlet throttle 10, the inflow amount of the medium is controlled in the direction of jet needle 11 and hydraulic coupler 4. In this context, hydraulic coupler 4 is designed, on the one hand, to intensify the stroke of piston 5 and, the other hand, to decouple the control valve from the static temperature expansion of actuator 2.

In what follows, the mode of functioning of this injector is discussed in greater detail. In every driving of actuator 2, operating piston 3 moves in the direction of hydraulic coupler 4. In this context, piston 5 having sealing member 12 also moves in the direction of second seat 7. In this context, a portion of the medium located in hydraulic coupler 4, for example, the fuel, is squeezed out through leakage gaps. Therefore, between two injections, hydraulic coupler 4 must be refilled to maintain its functional reliability.

Through a supply-line channel 9, a high pressure prevails that in the common-rail system can amount to, for example, between 200 and 1600 bar. This pressure pushes against jet needle 11 and holds it closed against the pressure of an undepicted spring, so that no fuel can escape. If, as a consequence of drive voltage Ua, actuator 2 is actuated and thus sealing member 12 moves in the direction of the second seat, then the pressure in the high-pressure area declines and jet needle 11 releases the injection channel. Because the pressure in hydraulic coupler 4 is much smaller, for example, only 10% of the high pressure, hydraulic coupler 4 is once again filled after the withdrawal of drive voltage Ua.

Figure 2:
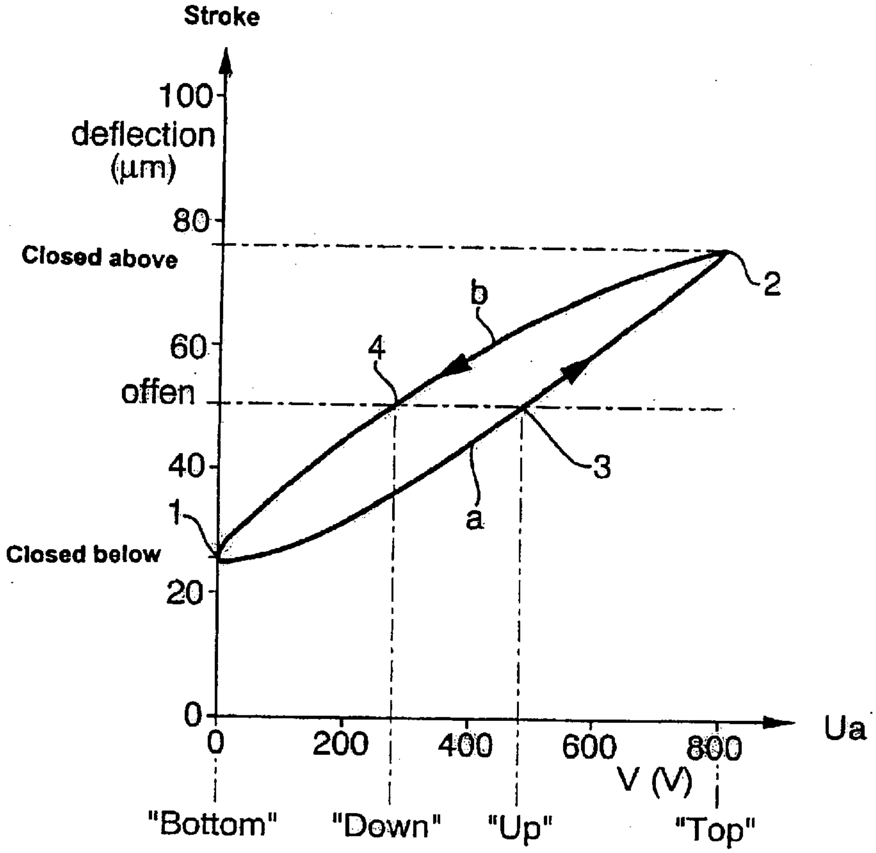
FIG. 2 depicts a diagram having a drive characteristic curve.

The diagram of FIG. 2 depicts a drive characteristic curve for actuator 2. The stroke, i.e., the change in length of actuator 2, is plotted as a function of drive voltage Ua. On account of the double-closing control valve 12, actuator 2 has two closed positions. In end position 1, sealing member 12 contacts first seat 6, if no drive voltage Ua is applied at actuator 2. This position is designated as "closed below" or "bottom." The second closed position is achieved in position 2, when the sealing member contacts second seat 7. In this case, the highest drive voltage Ua should be applied. This position is designated as "closed above" or "top." Between these two positions 1, 2 there are hysteresis characteristic curves a and b, which are traversed as a function of the direction of motion. For example, if sealing member 12 moves along characteristic curve a from position 1 in the direction of position 2, then drive voltage Ua must be increased accordingly. The position "open" or "up" is then achieved in position 3. This position represents an intermediate position of sealing member 12 between two seats 6 and 7. In the reverse case, when sealing member 12 moves from position 2 in the direction of position 1, then characteristic curve b is traversed. The "open" position is achieved in point 4. This point is designated as "down" or "open." Therefore, for the open position "open," two voltages "down" or "up" are possible. In practice, it has been demonstrated that these voltages, in addition to the hysteresis property of actuator 2, are also influenced by the force vectors, which differ in the different switching directions.

Figure 3:
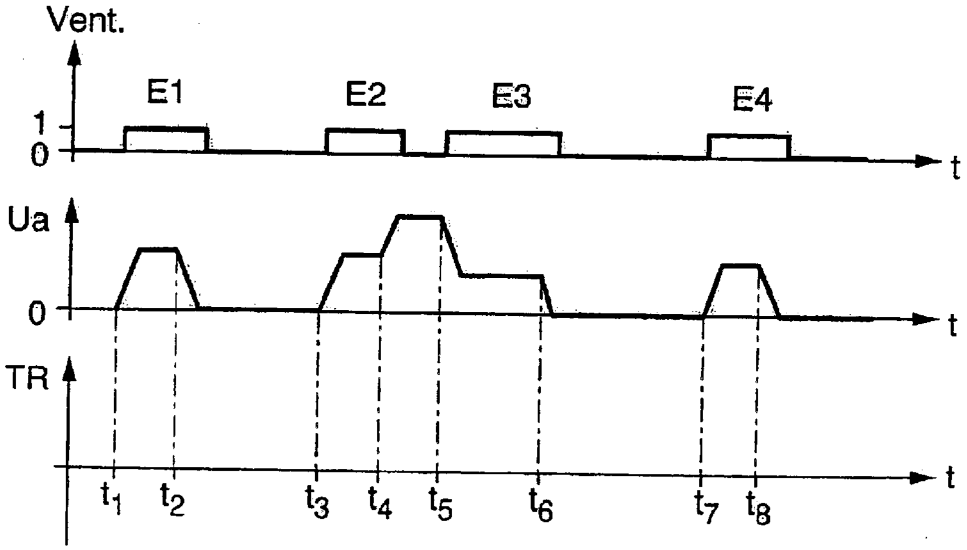
FIG. 3 depicts three functional diagrams.

In FIG. 3, for three functional diagrams, injection parameters Vent, Ua, and TR are plotted over time t for a fourfold injection in an injector 1. The upper diagram shows the injection duration in injections $E_1$, $E_2$, $E_3$, and $E_4$. Reference numeral 1 signifies that valve Vent is open. At 0, valve Vent is closed. The injections can be pre-injections, main injections, and after-injections for one single injection cycle in an injector. In a further configuration of the present invention, injection cycles that are configured differently are also conceivable as alternatives.

The middle diagram shows drive voltage Ua for actuator 2 with respect to the individual injections, so that injections $E_1$ . . . $E_4$ can take place. The lower diagram shows triggering TR for the driving of drive voltage Ua with respect to corresponding time points $t_1$, $t_2$, for the first injection, $t_3$, $t_4$ for the second injection, $t_5$, $t_6$ for the third injection, and $t_7$, $t_8$ for the fourth injection. In this context, it is noteworthy that drive voltage Ua is variably high as a function of the switching direction and the position of sealing member 12. For example, drive voltage Ua is highest between time points $t_4$, $t_5$. Here sealing member 12 contacts second seat 7, so that no injection can take place. Similarly, no injection can take place at the voltage, Ua=0.

Figure 4:
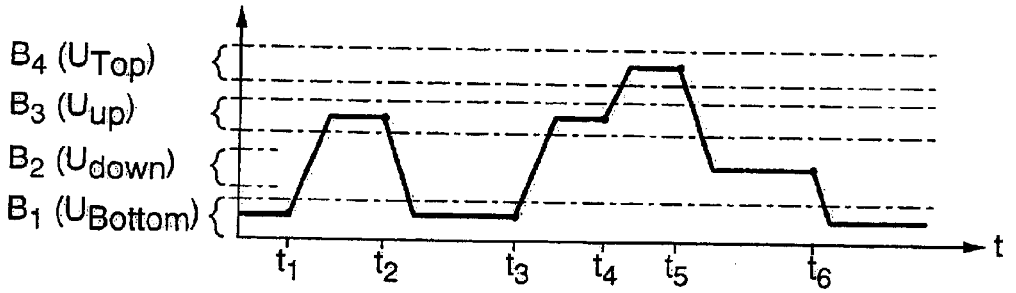
FIG. 4 depicts a voltage diagram.

On the basis of FIG. 4, the monitoring of these drive voltages according to the present invention is discussed in greater detail in their function, as were discussed with respect to FIG. 3. With regard to each voltage level, a tolerance band $B_1$, $B_2$, $B_3$, and $B_4$ is formed for the individual positions of sealing member 12. This tolerance band is formed on the basis of the operating parameters of the injection system, the internal combustion engine, or the environmental conditions. In a common-rail system, they are, for example, the pressure (rail pressure), the temperature, the engine speed, etc. Corresponding control circuits are proposed in FIGS. 5 and 6 and are discussed in greater detail below.

The control circuit supplies a setpoint control voltage for drive voltage Ua that is necessary for driving actuator 2, taking into account the individual parameters. For drive voltage Ua, corresponding tolerance bands $B_1$ through $B_4$ are situated around these setpoint values, preferably symmetrically. FIG. 4 shows once again a multiple injection for an injection cycle, which proceeds as follows. Up to time point $t_1$, drive voltage Ua is in the range of 0 V. Here tolerance band B, is situated in accordance with voltage $U_{bottom}$. This voltage corresponds to position 1 in FIG. 2. For the "open" position according to voltage $U_{up}$, tolerance band $B_3$ is provided. Accordingly, for the second end position 2 (FIG. 2), tolerance band $B_4$ is provided for voltage $U_{top}$. In response to the motion of sealing member 12 in the direction of first seat 6, tolerance band $B_2$ is provided in accordance with voltage $U_{down}$. Time points $t_1$ through $t_6$ represent the trigger points at which the voltage rises or falls. Before and after these time points, in each case using an available measuring device which is advantageously connected to terminal clamps of actuator 2, output voltage Ua is measured, and it is checked using an error device, as to whether the setpoint values for drive voltages Ua were reached.

If the setpoint values were not reached for one or a plurality of tolerance bands in repeated cycles, then the number of erroneous measurements is counted and stored. If the number of errors, or erroneous measurements, exceeds a preestablished threshold value, then the assumption can be made that there is a defect. For example, the control circuit can be faulty, or a fault can exist in the cable tree. Otherwise, if the preestablished threshold is not exceeded, then disruptions may exist that are not critical for the ongoing operation. In this case, the error storage unit is once again erased, because only a "temporary defect" was detected.

In response to a definite defect, the actuator can advantageously only be reset using a diagnostic interface in the context of maintenance. In an alternative configuration, it is provided to identify the error once again in every driving cycle. Both cases can be optionally provided as a function of the application.

As a further alternative, it is provided to go from regulation operation into control operation, if the regulation of the drive voltage no longer appears to be possible. In this case, it is advantageous to freeze to a certain extent the most recently set drive voltage Ua, or the regulator outputs, as described with respect to FIGS. 5 and 6, and to make use of them once again.

In what follows, two alternative exemplary embodiments for regulating the drive voltage, or its gradients, are discussed in greater detail.

Figure 5:
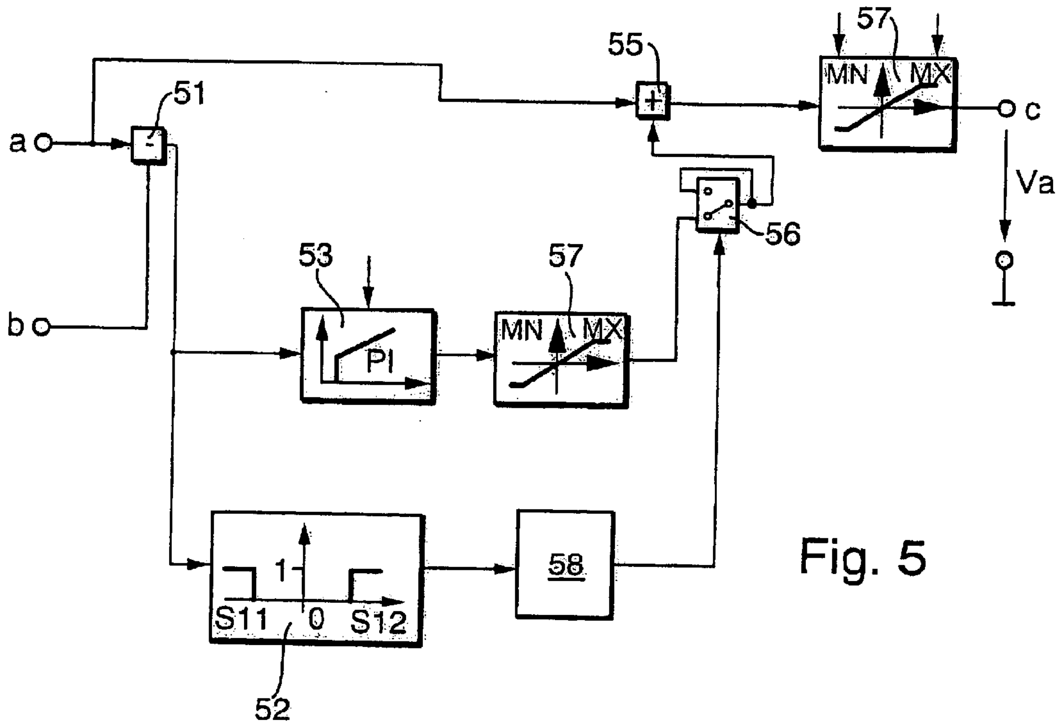
FIG. 5 depicts a block diagram for a voltage regulation device.

FIG. 5 in a schematic execution depicts a block diagram for the regulation of voltage level Ua. Initially, in a subtractor 51, a differential value is formed from the setpoint and actual values for drive voltage Ua that are supplied via inputs a and b. This differential value is compared in a downstream comparator 52 with the voltage position in the assigned tolerance band $B_1 \ldots B_4$ (e.g., lower threshold S11, upper threshold S12). The output is connected to a error debouncer 58. If the measuring value is in the range 0, then there is no error. If the value is 1, then an error exists, and a corresponding control signal is conveyed to changeover switch 56. At the same time, the differential value is conveyed to a downstream regulator 53 and, via a threshold value generator 54, is conveyed to changeover switch 56. On the one hand, changeover switch 56 can "freeze" the setpoint value, or, on the other hand, the setpoint value is conveyed to an adder 55, which adds the offset value to the setpoint value at clamp a. The output value is conveyed to a limiter 57, which at an output c generates drive voltage Ua for actuator 2. The changeover in accordance with the present invention takes place when the differential value for a preestablished number of measuring values lies outside of the specific tolerance band.

Figure 6:
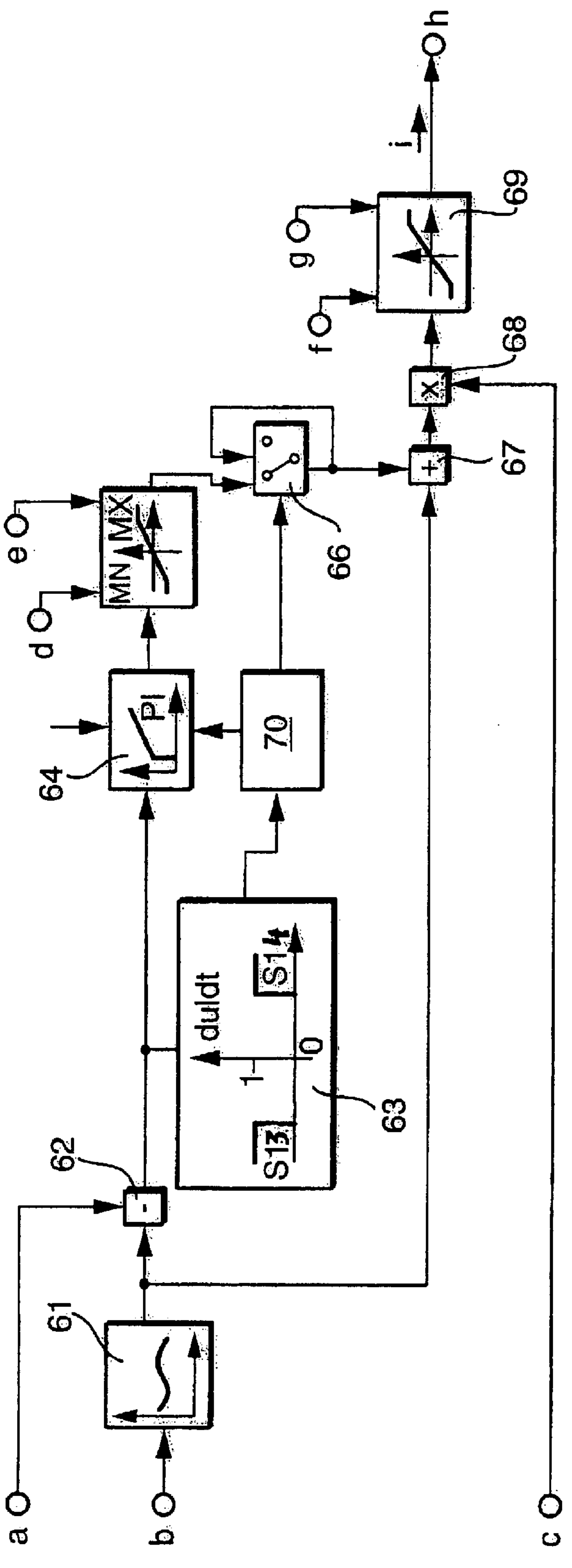
FIG. 6 depicts a block diagram for a gradient regulation device.

In what follows, the mode of functioning of FIG. 6 is described. Whereas for the voltage regulation, setpoint value Ua is generally determined by the rail pressure and the actuator temperature, for the calculation of gradient setpoint values dU/dt, the actuator voltages are determinative. This can be seen from the block diagram in FIG. 6. The cylinder-specific voltage value is supplied via an input b to differential member 61 for calculating the gradient setpoint characteristic curve. The latter is subtracted in a subtractor 62 from a gradient actual value, which was supplied to the subtractor via an input a. The gradient differential is supplied to a comparator 63, which compares it to a preestablished tolerance band $B_1 \ldots B_4$ (for example, lower tolerance value S13, upper tolerance value S14). The output signal arrives via an error debouncer 70 to the control input of changeover switch 66.

In addition, the differential signal arrives from differential member 62 to a regulator 64 and subsequently, via a threshold-value generator 65, to changeover switch 66. Just as in FIG. 5, the signal can be frozen or, after being linked in position 67 and 68, it can be supplied to a limiter 69 for limiting the current value for actuator 2. Additionally, in position 67, the cylinder-specific gradient setpoint value is added. In position 68, a capacitance value for actuator 2 can be entered via an input c. Furthermore, inputs f and g are provided for the minimum/maximum of current limiting 69. At output h, the current value is available.

The calculations are preferably carried out always individually for each cylinder of the internal combustion engine, in order to maintain optimal injection.

What is claimed is:

1. A method for diagnosing a driving for a piezoelectric actuator of an injector, comprising:

causing the piezoelectric actuator to bring a jet needle into one of an open position and a closed position;

causing a measuring device to measure a drive voltage of the piezoelectric actuator in individual control phases;

for each of the individual control phases, establishing a tolerance band for at least one of the drive voltage and a voltage gradient, the tolerance band being established by taking into account system and injection conditions including a pressure and a temperature; and performing a diagnostic check test such that, when a voltage level having the tolerance band is not reached, an error message is at least one of generated and stored.

2. The method as recited in claim 1, further comprising:

measuring the drive voltage in an area of actuator terminals.

3. The method as recited in claim 1, further comprising:

in a multiple injection having a drive curve cycle, measuring the drive voltage in every phase of the drive curve cycle.

4. The method as recited in claim 3, further comprising:

determining a setpoint value for the drive voltage as a function of a line pressure in a high-pressure system; and setting the tolerance band around the setpoint value symmetrically.

5. The method as recited in claim 1, wherein:

the injector is configured having a double-switching control valve, and the tolerance band is formed for voltage levels including at least one of bottom, up, top, and down.

6. The method as recited in claim 1, further comprising:

when the tolerance band is not reached, discharging the piezoelectric actuator, so as to move to a more secure state.

7. The method as recited in claim 1, wherein:

when the tolerance band is detected as not having been reached, measuring values are not used for further calculations.

8. The method as recited in claim 1, further comprising:

in response to a preestablished number of measuring cycles, performing a check test as to how frequently the drive voltage has not reached the tolerance band.

9. The method as recited in claim 8, further comprising:

when the preestablished number of measuring cycles has been reached, performing a switchover from regulating drive voltage to controlling drive voltage.

10. The method as recited in claim 8, further comprising:

when the preestablished number of measuring cycles is reached, switching off at least the piezoelectric actuator.

11. The method as recited in claim 8, further comprising:

when the preestablished number of measuring cycles is reached, maintaining a most recently established output quantity of regulators for at least one of the voltage level and the voltage gradient.

12. The method as recited in claim 8, wherein:

when a preestablished limiting value is not exceeded for a number of measured errors, the piezoelectric actuator is recognized as in working order.

13. The method as recited in claim 12, further comprising:

resetting an error storage unit.

14. The method as recited in claim 1, wherein:

the method is used for an injector in a common-rail system of a motor vehicle engine.

* * * * *